(12) United States Patent
Gallet et al.

(10) Patent No.: US 10,082,040 B2
(45) Date of Patent: Sep. 25, 2018

(54) AIRCRAFT COMPRISING A TURBINE ENGINE INCORPORATED INTO THE REAR FUSELAGE WITH VARIABLE SUPPLY

(71) Applicant: SAFRAN AIRCRAFT ENGINES, Paris (FR)

(72) Inventors: Francois Gallet, Moissy-Cramayel (FR); Nicolas Jerome Jean Tantot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/745,704

(22) PCT Filed: Jul. 21, 2016

(86) PCT No.: PCT/FR2016/051882
§ 371 (c)(1),
(2) Date: Jan. 18, 2018

(87) PCT Pub. No.: WO2017/013360
PCT Pub. Date: Jan. 26, 2017

(65) Prior Publication Data
US 2018/0209294 A1    Jul. 26, 2018

(30) Foreign Application Priority Data

Jul. 22, 2015  (FR) ...................................... 15 56950
Jul. 22, 2015  (FR) ...................................... 15 56951

(51) Int. Cl.
*F01D 17/14*         (2006.01)
*B64D 27/20*         (2006.01)
(Continued)

(52) U.S. Cl.
CPC ............ *F01D 17/141* (2013.01); *B64C 11/48* (2013.01); *B64D 27/14* (2013.01); *B64D 27/20* (2013.01);
(Continued)

(58) Field of Classification Search
CPC ......... B64C 11/48; B64D 27/14; B64D 27/20; F01D 17/14; F01D 17/141; F01D 17/145;
(Continued)

(56) References Cited

U.S. PATENT DOCUMENTS 2,601,194 A    6/1952  Whittle
3,371,480 A *  3/1968  Page ........................ F02C 6/02
                                                   415/199.5
(Continued)

FOREIGN PATENT DOCUMENTS

FR         1555756         1/1969
FR         2997681         5/2014
WO    WO 2014072615 A1 *  5/2014 ............. F01D 13/02

OTHER PUBLICATIONS

International Search Report and Written Opinion with English Language Translation, dated Nov. 23, 2016, Application No. PCT/FR2016/051882.

*Primary Examiner* — Carlos A Rivera
*Assistant Examiner* — Kyle Thomas
(74) *Attorney, Agent, or Firm* — Womble Bond Dickinson (US) LLP (57) ABSTRACT

The invention concerns an aircraft propelled by a turbine engine having contrarotating fans (7, 8), the turbine engine being incorporated at the rear of a fuselage (1) of the aircraft, in the extension of same and comprising at least two gas generators (2*a*, 2*b*) that supply, via a shared central stream (4), a power turbine (3), the turbine (3) comprising two contrarotating rotors (5, 6) for driving two fans (7,8) dis-
(Continued)

posed downstream from the gas generators (2a, 2b), said aircraft comprising means (15) arranged for separating the gas flow in the power turbine (3) into at least two concentric streams (16, 17) and a device comprising first means for distributing the gas flow (21-24) between said streams (16, 17) from the central stream (4), the first distribution means being configured to be able to open or close the supply of at least one so-called sealable stream (16) of the streams (16, 17) of the power turbine (3).

17 Claims, 4 Drawing Sheets (51) Int. Cl.
| | |
|---|---|
| *F02K 3/072* | (2006.01) |
| *F02K 3/12* | (2006.01) |
| *F01D 17/16* | (2006.01) |
| *B64D 27/14* | (2006.01) |
| *F01D 1/02* | (2006.01) |
| *B64C 11/48* | (2006.01) |
| *F01D 1/24* | (2006.01) |
| *F02K 3/075* | (2006.01) |
| *F02K 3/077* | (2006.01) |
| *F01D 17/10* | (2006.01) |

(52) U.S. Cl.
CPC ............... *F01D 1/023* (2013.01); *F01D 1/24* (2013.01); *F01D 17/105* (2013.01); *F01D 17/14* (2013.01); *F01D 17/145* (2013.01); *F01D 17/148* (2013.01); *F01D 17/16* (2013.01); *F01D 17/162* (2013.01); *F01D 17/167* (2013.01); *F02K 3/072* (2013.01); *F02K 3/075* (2013.01); *F02K 3/077* (2013.01); *F02K 3/12* (2013.01); *F05D 2220/323* (2013.01); *F05D 2240/128* (2013.01); *F05D 2260/606* (2013.01); *F05D 2270/093* (2013.01); *F05D 2270/102* (2013.01)

(58) Field of Classification Search
CPC ...... F01D 17/148; F01D 17/16; F01D 17/162; F01D 17/167; F01D 1/023; F01D 1/24; F02K 3/072; F02K 3/075; F02K 3/077; F02K 3/12; F05D 2220/323
See application file for complete search history.

(56) References Cited

U.S. PATENT DOCUMENTS

| | | |
|---|---|---|
| 4,080,785 A | 3/1978 | Koff et al. |
| 2006/0196164 A1* | 9/2006 | Donohue ................ F01D 5/147 60/226.1 |

* cited by examiner

AIRCRAFT COMPRISING A TURBINE ENGINE INCORPORATED INTO THE REAR FUSELAGE WITH VARIABLE SUPPLY

FIELD OF THE INVENTION AND PRIOR ART

The present invention relates to the field of aircraft such as aeroplanes, in particular civilian aeroplanes, propelled by a turbine engine integrated into the extension of the fuselage, downstream thereof. It relates more specifically to the means for adapting the turbine engine in this type of architecture to particular operating situations which must be considered for safety reasons.

Patent application FR-A1 2997681 proposed a new aircraft architecture to reduce noise pollution and aircraft fuel consumption by reducing aerodynamic drag caused by absorption of the boundary layer.

In such an architecture, an aircraft is propelled by a turbine engine having ducted contra-rotating fans, the turbine engine being integrated at the rear of the fuselage of the aircraft. Generally, the turbine engine comprises at least two gas generators which feed a power turbine having two contra-rotating rotors for driving two fans arranged downstream of the gas generators. The gas generators have distinct lateral air intakes to feed each generator.

Downstream of the gas generators, fans are arranged in the continuation of the fuselage of the aircraft and are usually fed by an annular ring connected thereto, so as to absorb at least part of the boundary layer formed around the fuselage. The diameter of the fans is approximately that of the fuselage at its largest cross section. The rotational speed of the fans is generally lower than that for conventional turbine engines, in particular so as to ensure a subsonic speed at the blade tip, the radius of which is large.

The power turbine is therefore dimensioned to operate by being fed by all the gas generators. In the case where one of the gas generators is shut down due to a voluntary or accidental cause, the flow entering the turbine is substantially reduced. For example, it is practically divided in two in the case of two gas generators with only one in operation. The passage cross section of the flow duct of the turbine is then too large for the flow in question, and the speed of the flow therein is greatly reduced. The power provided by the turbine, depending on the flow rate and flow velocity passing through it, drops too low and is, for example, much lower than that obtained for an aircraft having two separate turbine engines when one of these engines is shut down.

Furthermore, in the proposed aircraft design, the position and shape of the air intakes may result in the gas generators being fed with a flow having a high level of distortion, which would compromise the stability of their low-pressure compressor. Specifically, too great variations in the aerodynamic passage cross section from the power turbine significantly influence the operating ability of the gas generator compressor, and may lead to the surge risks in the operational gas generator(s).

The object of the present invention is in particular to adapt the turbine to the case where one of the gas generators is shut down and there is at least one still operating.

DISCLOSURE OF THE INVENTION

For this purpose, the invention relates to an aircraft propelled by a turbine engine having contra-rotating fans, the turbine engine being integrated at the rear of the fuselage of the aircraft, in the continuation of the fuselage, and comprising at least two gas generators which feed a power turbine through a common central flow duct, the turbine comprising two contra-rotating rotors for driving two fans located downstream of the gas generators, the aircraft comprising separating means designed to separate the flow of gas in the power turbine into at concentric flow ducts and a device comprising first distribution means for distributing the gas flow between these two flow ducts from the central flow duct, said first distribution means being designed to be able to open or close the feed of at least one flow duct, referred to as the concealable flow duct, from among the at least two concentric flow ducts of the power turbine.

Said at least one concealable flow duct preferably has a passage cross section substantially equal to the total passage cross section in the turbine divided by the number of gas generators. Thus, when one gas generator is shut down and the other gas generators are operating, the first distribution means of the device make it possible to maintain a contra-rotating turbine in downgraded mode in which only the cross section of each blade present in the non-concealed flow duct(s) is subjected to the flow. Since the overall passage cross section of the non-concealed flow ducts corresponds to the flow supplied by the gas generator(s) that are still operating, the speed of the flow to which the blades are subjected is substantially the same as in normal operation. The supplied power is decreased due to the lessened flow, but the effect of a significant drop in the speed of the incident flow on the blades is not added to this.

Furthermore, the fact that the first distribution means are in the common central flow duct means that there is no flow duct specifically for one gas generator or the other since their flows mix in the central flow duct. The first distribution means therefore makes it possible to adapt the passage cross section for the gases in the power turbine to the gas generators that are still operating, without knowing which one is shut down.

Preferably, since each rotor of the power turbine comprises at least one blade ring, the separating means for separating the flow into concentric flow ducts comprises fins extending circumferentially between the blades of each ring, at an intermediate radius between the radial ends of these blades.

Advantageously the first distribution means comprise gas flow passages that are intended for feeding gas flow coming from the central flow duct to each of the at least two concentric flow ducts of the power turbine, and are rigidly connected to a fixe structure of the turbine engine.

Preferably, said radially innermost concentric flow duct in the power turbine is a concealable flow duct. Therefore, it is preferably the outer portion of the blades which is subjected to the incident flow when the turbine is operating in downgraded mode.

According to a preferred embodiment, said at least one concealable flow duct comprises an intake opening in the central flow duct, defined between two edges that follow substantially the same curve around an axis of the turbine engine and are offset along said axis.

Preferably, the first distribution means comprise a part that is movable in translation along an axis of the turbine engine and are designed such that said part opens or closes the intake cross section of said at least one concealable flow duct of the power turbine depending on its translational position. Thus, since there is no rotating part, the first distribution means can have a simple design, having actuators that may be placed in the fuselage where the bulk issue is less severe.

Preferably, the aircraft comprises means designed to feed a ventilation air flow to said at least one concealable flow duct of the power turbine when its gas feed through the central flow duct is closed.

In fact, the means for separating the concentric flow ducts of the power turbine are not whole. They may allow a leakage current to pass through. The ventilation flow flushes out the concealable flow duct when it is closed and counteracts the tendency of the primary gases to escape into the concealable flow duct through the gaps between the fins.

Advantageously, the aircraft comprises means designed to close the outlet of said at least one concealable flow duct of the power turbine when its gas feed through the central flow duct is closed. This prevents the ventilation flow from being sucked up by the rotation of the turbine blades. It can only escape through the gaps between the fins and thus performs its flushing effect.

Advantageously, the closure means at the outlet of said at least one concealable flow duct are controlled according to the difference between a resilient restoring force and a gas pressure at the outlet of said at least one concealable flow duct. In fact, the pressure exerted by the ventilation flow is much weaker than that exerted by the primary flow when the flow duct is open. It is therefore easy to control the restoring force such that the means close when the feed from the flow duct is closed and open, without hindering the operation of the turbine, when the feed from the primary flow duct is operating.

Advantageously, arms for supporting a downstream casing, which rotates together with a rotor of the power turbine, that are distributed in a ring at the outlet of said turbine support said closure means.

In this case, said closure means may comprise flexible strips, each being secured to a support arm in the region of the leading edge and extending in the circumferential direction up to a neighbouring support arm when no force is exerted thereon in a direction originating from at said at least one concealable flow duct.

Finally, the invention relates more specifically to an aircraft in which the generators are fed through distinct air intakes, arranged at the periphery of the fuselage of the aircraft.

According to another feature of the invention, the device comprises two distribution means comprising a ring of substantially radial, variable-pitch stator vanes.

In this case, the passage cross section for the gas flow is closed to its minimum value by greatly increasing the pitch of the stator vanes, hereafter also referred to as distributor blades. In contrast, the flow towards the power turbine is optimised, in order to adapt it to the operating point of the compressor or of the gas generators in operation, by very small variations of the pitch angle, approximately several tenths of a degree.

In the nominal operating mode of the turbine engine, the second distribution means make it possible to position the operating point of the gas generator compressor in a safe operating zone, according to the flight conditions and distortion level, by finely optimising the blade pitch angle by approximately several tenths of a degree.

In the case of a breakdown, the second distribution means make it possible to smooth the passage cross section transition to the power turbine by means of rapid but steady closing, corresponding to a few degrees for the variation of the blade pitch angle, provide a controlled migration of the operating point of the un-halted gas generator compressor, and minimise the surge risk.

Advantageously, the pitch of the blades may be adjusted individually. This makes it possible to correct flow distortions at the power turbine intake; these may be large, in particular when only one of the gas generators remains in operation.

According to another feature of the invention, means for actuating the second distribution means are designed so as to vary the passage cross section depending on the intake conditions of the operational gas generator(s).

When the compressor of the gas generators is subject to large distortions in its air feed, even during nominal operation, in particular for a turbine engine in which its gas generators are inside the fuselage and have very angled air intakes, said actuation means may compensate for the lack of a device for controlling the operability of the compressors. In this case, optimisation based on very small cross-sectional variations makes it possible to position the operating point of the gas generator compressor in a safe operating zone.

According to another feature of the invention, the second distribution means are installed so as to vary the passage cross section for the gas flow up to a minimum value substantially equal to or less than the passage cross section in the second concentric flow duct.

Thus, the rapid closing of the second means smooths the passage cross section transition before closing the second distribution means in order to obstruct the first flow duct. An at least partial re-opening of the second distribution means may be planned during the closing of the first distribution means in order to maintain a suitable gas flow for the operation of the remaining gas generator. The re-opening of the second distribution means allows the power turbine to function without leading to significant distortions in the open concentric flow duct.

According to another feature, the second distribution means are located downstream of the first distribution means in the gas flow.

According to yet another feature, the first flow path of said concentric flow ducts is radially inner in relation to the second flow duct.

The invention could also relate to a turbine engine comprising two gas generators designed to generate a primary flow which is supplied to the power turbine by a central flow duct, said power turbine comprising at least one rotor driving at least one fan rotor, the turbine engine comprising, between the central flow duct and the power turbine, distribution means designed to vary, over time and transversely around an axis of the turbine engine, both an incidence of the primary flow, so as to adapt said incidence to the operation of the power turbine, and a passage cross section for the primary flow, so as to adapt said passage cross section to changes in the operating status of said at least two gas generators that impact a primary flow rate.

The distribution means comprising the second distribution means.

The wording "transverse variation around the axis" is understood here to mean that the passage cross section varies substantially uniformly and proportionally along the radius starting from the axis.

In this way, in addition to the fact that these means can play the role of standard distributor at the turbine intake, changes in the operating status of the gas generators concerning, among other things, the shutdown of a gas generator while maintaining at least one gas generator supplying the primary flow, the passage cross section may be steadily adjusted, by said second distribution means, to the functioning of the at least one remaining gas generator. By means of rapid but steady closing, said second distribution means smooths the passage cross section transition experienced by the at least one gas generator remaining in operation. This steadiness results in a controlled migration of the operating point of the compressor of said at least one gas generator, and thus minimises surge risks.

The invention also relates to a method for managing a breakdown in an aircraft turbine engine, for changing over from operation using two gas generators to operation using a single gas generator, said engine having any of the preceding features, said method comprising the following steps:
 a closing step a), preferably rapidly but steadily, for closing the second distribution means so as to adjust the flow in the power turbine to the single gas generator in operation, and.
 a step b) consisting of closing the first distribution means while re-opening the second distribution means, so as to operate the power turbine using a single concentric flow duct while maintaining the flow adapted to operation of a single gas generator.

The invention also relates to a method for controlling an aircraft turbine engine having any of the above-mentioned features. According to the method, the position of the second distribution means is controlled according to parameters influencing the operating ability of the low-pressure compressors of the gas generators.

BRIEF DESCRIPTION OF THE FIGURES

The present invention will be better understood, and other details, features and advantages of the present invention will become clearer upon reading the following description of a non-limiting example, with reference to the accompanying drawings, in which.

DESCRIPTION OF AN EMBODIMENT

Figure 1:
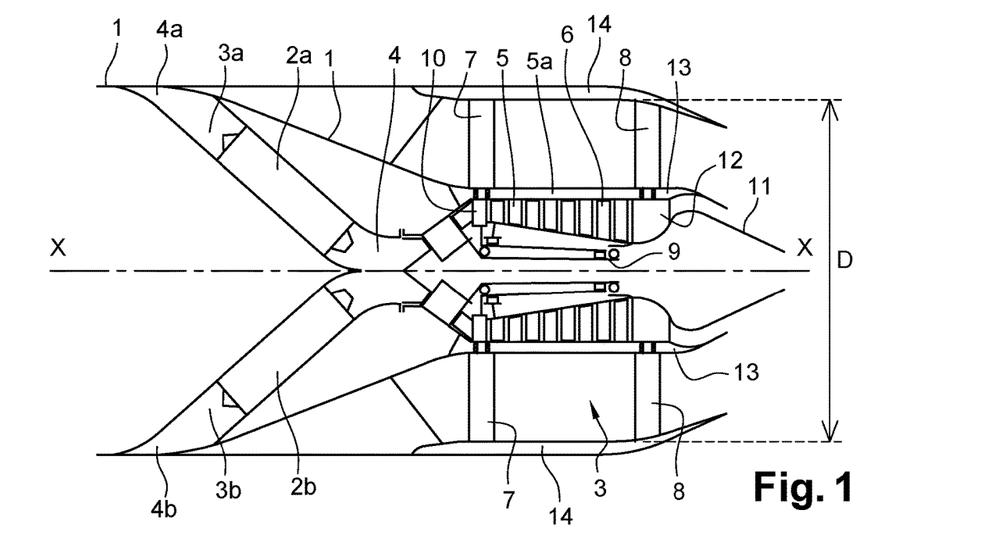
FIG. 1 is a schematic longitudinal section through the rear portion of an aircraft equipped with a turbine engine according to the invention.

The invention applies in particular, but not exclusively, to an aircraft such as an aeroplane comprising a turbine engine of the type shown by FIG. 1.

As shown in FIG. 1, the turbine engine is centred on the longitudinal axis XX of the fuselage 1 of the aircraft. This turbine engine comprises, from upstream to downstream in the gas flow direction, two distinct gas generators 2a, 2b simultaneously feeding one power turbine 3. The turbine engine is installed at the downstream end of the fuselage 1 of the aircraft.

In this document, the terms axial and radial refer to the axis XX of the fuselage and turbine engine. Likewise, the terms upstream and downstream refer to the direction of the main flow along this axis.

In a manner known per se, each gas generator 2a, 2b comprises at least one compressor, one combustion chamber and one high-pressure turbine (not shown in the figures).

Each gas generator 2a, 2b is housed inside a primary flow duct 3a, 3b. Distinct air intakes 4a, 4b are provided for these flow ducts 3a, 3b in order to feed each gas generator 2a, 2b. In the example shown, the air intakes 4a, 4b are connected to the fuselage 1 of the aircraft, upstream of the gas generators 2a, 2b, and their inner wall is directly integrated into the fuselage 1. Thus, they absorb a portion of the boundary layer formed around the fuselage 1 of the aircraft. In another configuration (not shown) the lateral air intakes feeding the gas generators may be, in contrast, diverted from the fuselage 1 of the aircraft, in order to minimise this phenomenon of absorption of the boundary layer and to facilitate the operation of the gas generators. In addition, more than two gas generators, for example three, may be used to feed the power turbine 3.

Preferably the two primary flow ducts 3a, 3b of the gas generators 2a, 2b converge on the longitudinal axis XX and form a V, open in the upstream direction, the angle of opening of which is preferably between 80° and 120°.

The two primary flow ducts 3a, 3b for the gas generators 2a, 2b converge in a central primary flow duct 4 which feeds the power turbine 3. A mixer (not shown in the figures) is preferably positioned at area of convergence of the two flow ducts 3a, 3b, which house the gas generators 2a, 2b. This mixer is used to mix the gaseous flows coming from the two gas generators 2a, 2b to create a single homogeneous gaseous flow at the outlet of the primary central flow duct 4.

The power turbine 3, which is fed by this primary flow at the outlet of the central flow duct 4, is equipped with two contra-rotating turbine rotors 5, 6 to drive two fans 7, 8 in a contra-rotational manner. In other words, the central flow duct 4 is arranged upstream of the power turbine. The central flow duct has a circular cross section. These turbine rotors 5, 6 are coaxial and centred on the longitudinal axis XX. They rotate around a central casing 9 secured to the structure of the aircraft.

Here, a first turbine rotor 5 corresponds to blades connected to a tubular body 5a separating the primary flow duct, in the power turbine 3, from the secondary flow duct, in which the fans 7, 8 are found. The blades and tubular body 5a of the first rotor 5 are connected to the support bearings for supporting the rotor 5 on the inner casing 9 by means of support arms 10, which cross the primary flow duct upstream of the power turbine 3.

In the same example, the second rotor 6 corresponds to blades that are connected to a radially inner wall of the primary flow duct in the turbine 3 and are placed longitudinally between the blades of the rotor 5.

Downstream of the power turbine 3, the radially inner portion of the second rotor 6 is extended by a central body 11. In addition, said portion is connected by support arms 12 to a ring 13 for supporting the blades of the downstream fan 8. In addition, this ring 13 extends the tubular body 5a of the first rotor 5 and has a rearward extension in order to form, together with the central body 11, a primary exhaust nozzle at the outlet of the power turbine 3.

In the example shown, a first, upstream fan 7 is positioned at the intake of the power turbine 3. The fan is connected to the first rotor 5 of the power turbine at the arms 10 which provide upstream support for the outer cylindrical body 5a. This upstream fan 7 therefore rotates at the same speed as the first rotor 5 of the power turbine 3.

In the same example, the second, downstream fan 8 is positioned at the outlet of the power turbine 3. The fan is connected to the second rotor 6 of the power turbine at the support ring 13 and at the arms 12 that support said ring. This downstream fan 8 therefore rotates at the same speed as the second rotor 6 of the power turbine 3.

The two fans 7, 8 are ducted by a nacelle 14 secured to the structure of the aircraft. In this case, this nacelle 14 is secured in particular to the vertical tail unit of the aircraft (not shown in the figures). The fans have an outer diameter D which substantially corresponds to the highest outer diameter of the fuselage 1 of the aircraft.

Since the air entering the fans 7, 8 is partly composed of the boundary layer of the aircraft fuselage, the entry speed is low compared with conventional turbine engine fans, and the exit speed is also lower when at an identical compression rate, which improves the propulsive and acoustic performance of these fans. Furthermore, the large outer diameter D of fans 7, 8 means that their rotational speed, like that of the rotors 5, 6 of the power turbine 3, will also remain low compared with a conventional turbine engine.

Figure 2:
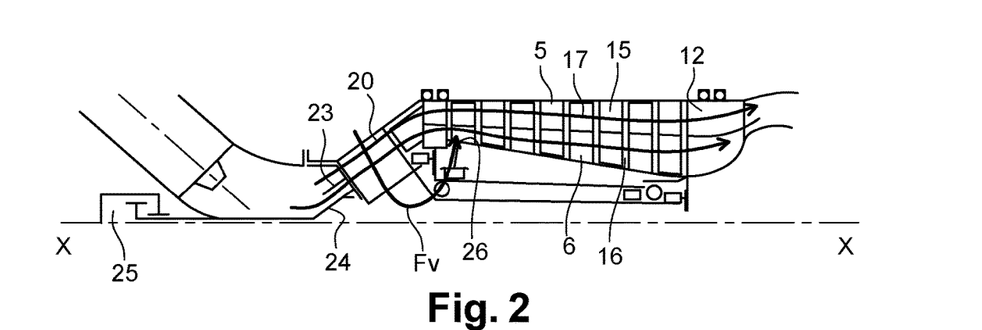
FIG. 2 is a schematic longitudinal half-section through the turbine engine according to the invention in the region of the power turbine in downgraded operating mode.

According to a first aspect of the invention, with reference to FIG. 2, the turbine blades of the two rotors 5, 6, as well as the support arms 10, 12 of these rotors which cross the primary flow, are equipped with fins 15 having a circumferential extension, substantially halfway between the radial ends of the primary flow duct.

Figure 4:
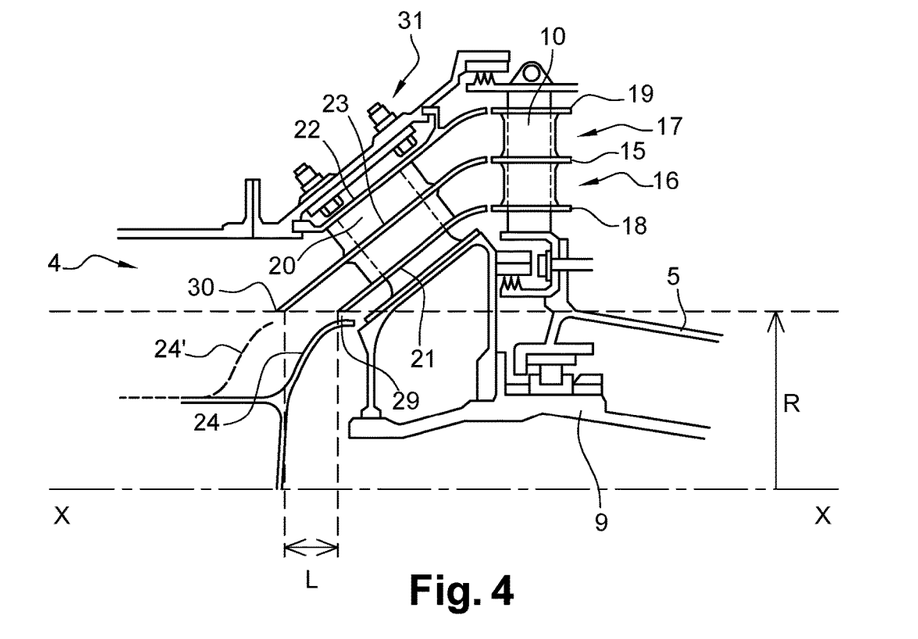
FIG. 4 is a schematic longitudinal section through an embodiment of first adjustable means for distributing the primary flow at the intake of the power turbine.

The shape of the fins 15 makes it possible to separate the primary flow path into a radially inner flow duct 16 and a radially outer flow duct 17, the two flow ducts revolving around the longitudinal axis XX. FIG. 4 shows the shape of these fins 15 on a support arm 10 of the first rotor 5. Such fins 15 here provide the separation between the inner flow duct 16 and outer flow duct 17, in a continuous manner in the circumferential direction, but longitudinally leave a space between them, in order to allow for the different rotation of the successive stages of the turbine. In this respect, they are comparable to the collars 18, 19 which are located at the root and tip of the blades or of the arms in the turbine 3 and form the inner and outer walls of the primary flow passage in the power turbine 3. These collars 18, 19, as well as the fin 15, are shown on the support arms 10 of the first rotor 5 in FIG. 4.

With reference to FIG. 4, a device is installed to distribute the primary flow from the central flow duct 4 between the inner flow duct 16 and the outer flow duct 17 of the power turbine 3.

Here, the device comprises first distribution means 31 secured by their outer periphery to a structure of the turbine engine or of the aircraft and by their inner periphery to the central casing 9 and connecting the central flow duct 4 to the power turbine. The first distribution means 31 comprise a ring of structural arms 20 that are inclined in relation to the longitudinal axis XX, making it possible to hold the central casing 9 of the power turbine 3 on the fixe structure of the turbine engine upstream. The direction perpendicular to these structural arms defines a divergence cone from the central flow duct 4 to the flow ducts 16, 17 of the power turbine 3.

This ring of structural arms 20 makes it possible to have a series of frustoconical collars 21, 22, 23 widening towards the rear. These structural arms 20 are, as an example, partially shown in dotted lines in FIG. 4.

An outer frustoconical collar 22 forms the connection between the outer radial wall of the central flow duct 4 and the outer radial wall of the outer flow duct 17 of the turbine 3. An inner frustoconical collar 21 formed in this case, beginning with an upstream edge 29, in a circular manner and having a particular radius R, is connected to the radially inner wall of the inner flow duct 16 of the turbine 3. An intermediate frustoconical collar 23 is also secured to the support arms 20 in order to separate the flow duct between the two end collars 21, 22 into two flow ducts of substantially identical cross section and to connect, in its downstream portion, to the fins 15 on the arm 10 of the first rotor 5. In particular, the intermediate collar 23 is installed radially between the outer frustoconical collar 22 and the inner frustoconical collar 21. Thus, the frustoconical collars 21, 22, 23 extend the inner flow duct 16 and outer flow duct 17 of the power turbine 3 in an upstream direction.

Preferably, the intermediate frustoconical collar 23 extends towards the front, in the central flow duct 4, following a constant inclination, up to an upstream edge 30 located at an axial distance L upstream of the upstream edge 29 of the inner collar 21. The upstream edge 30 of the intermediate collar 23 is substantially circular, having a radius R equal to that of upstream edge 29 of the inner collar 21.

Furthermore, the first distribution means 31 comprise a rotating part 24 in the shape of a dome. The rotating part 24 closes the central flow duct 4 up to the particular radius R at which the inner frustoconical collar 21 ends. In accordance with this feature, the rotating part 24 is movable in translation along the longitudinal axis XX. The part can be moved by actuators 25 (shown in FIGS. 2 and 3) which may be found in the fuselage 1 of the aircraft in front of the turbine engine. The part may be positioned, as illustrated in FIG. 4, either in a position where it connects to the upstream edge 29 of the inner collar 21, or in a position where it connects to the upstream edge 30 of the intermediate collar 23.

With reference to FIG. 2, when movable part 24 is positioned towards the rear by the actuators 25, the primary air flow coming from central flow duct 4 is separated, as is indicated by the two arrows coming from the central flow duct, into two flows divided between the inner flow duct 16 and the outer flow duct 17 of the power turbine 3. This corresponds to the case where the flow coming from the central flow duct 4 is the output mixture of the two gas generators 2a, 2b in operation.

Figure 3:
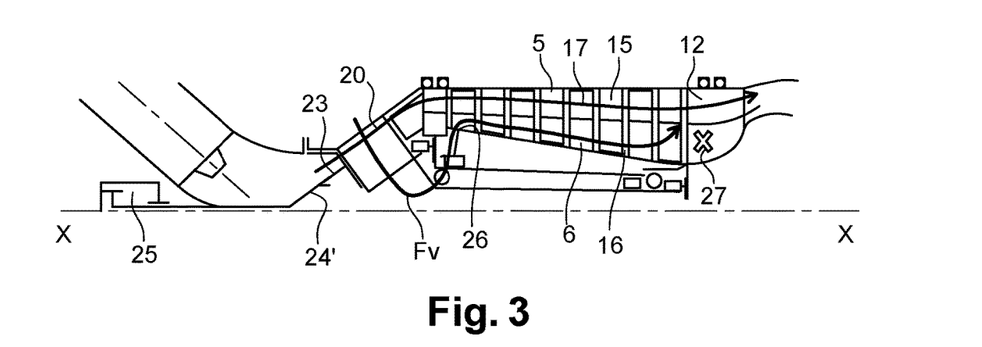
FIG. 3 is a view from above of schematic longitudinal half-section through the turbine engine according to the invention in the region of the power turbine in downgraded operating mode.

With reference to FIG. 3, when the movable part 24 is positioned towards the front, in position 24', by the actuators 25, the primary air flow coming from the central flow duct 4 only passes through the outer flow duct 17 of the power turbine 3, as is shown by the arrow coming from the central flow duct 4. This corresponds to the case where the flow coming from the central flow duct only supplies one gas generator, 2a or 2b.

According to another aspect of the invention, the power turbine 3 is arranged to introduce a ventilation air flow Fv into the inner flow duct 16 when its intake is closed. With reference to FIG. 3, this ventilation air flow Fv may be drawn upstream from the turbine 3 through and air intake (not shown) and be channelled towards an inlet 26 in the upstream portion of the inner flow duct 16 while passing through the structural support arms 20 of the central casing 9. As shown by the arrow in FIG. 2, this ventilation air inlet 26 in the inner flow duct 16 is closed when the inner flow duct 16 is in communication with the primary central flow duct 4.

Furthermore, this ventilation air intake 26 may be controlled by a valve system which opens and shuts automatically, depending on the pressure applied by the primary flow, following which it either enters the inner flow duct 16 or not.

Preferably, when the intake of primary air into the inner flow duct 16 of the turbine 3 is closed, means 27 for closing the outlet of the inner flow duct 16 are actuated. Thus, the ventilation air can only escape via the space located between the fins 15, and may thus execute its flushing function.

Of course, these means 27 must be open when the power turbine 3 is operating using its two flow ducts 16, 17 through which the primary air flow passes.

Figure 5A:
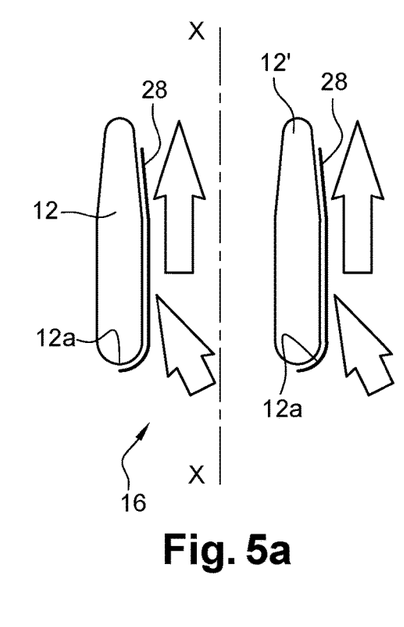
FIGS. 5a and 5b are schematic circumferential views, extending between two adjacent support arms, of a means for blocking the primary flow at the outlet of a flow duct of the power turbine in two operating conditions.
Figure 5B:
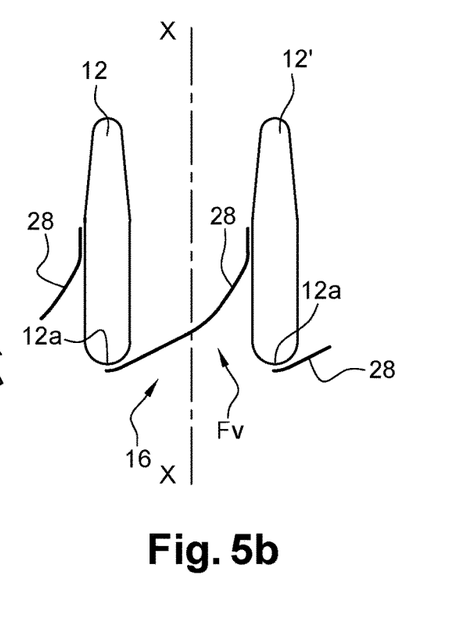

A non-limiting example of the device for implementing these closure means 27 such that they close and open automatically depending, respectively, on the upstream closing and opening of the inner flow duct 16, is described in FIGS. 5a and 5b.

With reference to FIG. 5a, flexible strips 28 of the height of the radial extension of the inner flow duct 16 are secured to each support arm 12 of the second rotor 6, at the rear of the turbine 3. These flexible strips 28 have approximately the same length along the longitudinal axis XX as the arms 12 and of a value greater than the distance between two successive arms 12 in the circumferential direction. They are placed on the pressure face of each arm 12 in relation to the rotation direction of the primary flow, as shown by dotted arrows in FIG. 5a and they are secured to each arm 12 at the leading edge 12a thereof.

As shown in FIG. 5a, when the inner flow duct 16 is open and the primary flow (shown by the thick arrows) arrives at these strips 28, this flow has sufficient energy to press the strips 28 against the arms 12 of the second rotor 6, and therefore, to release the space necessary for it to pass through.

In contrast, with reference to FIG. 5b, when the inner flow duct 16 is closed and it is the ventilation air (shown by the arrows in thin lines) that arrives at these strips 28, this air does not have enough pressure to push these strips 28. These strips 28 therefore rest, beginning with the leading edge 12a of each arm 12, and their rear end is leaned on the adjacent arm 12. They thus form an obstruction of the downstream outlet of the inner flow duct 16 and force this ventilation air to escape through the spaces located between the fins 15, towards the outer flow duct 17, into the power turbine 3.

Thus, a method for changing over, in such an aircraft, to operating the turbine engine using a single gas generator, for example in case of an accidental loss of one of the two, may substantially involve, at least with regard to the power turbine 3, a command to move the movable part 24 towards the front, into position 24', in order to block the entry of the primary flow into the inner flow duct 16. In this case, the ventilation air flow Fv is implemented, when the air inlet 26 is opened and the outlet of the inner flow duct 16 is obstructed by the closure means 27, which are automatically controlled by the flow conditions.

Figure 6:
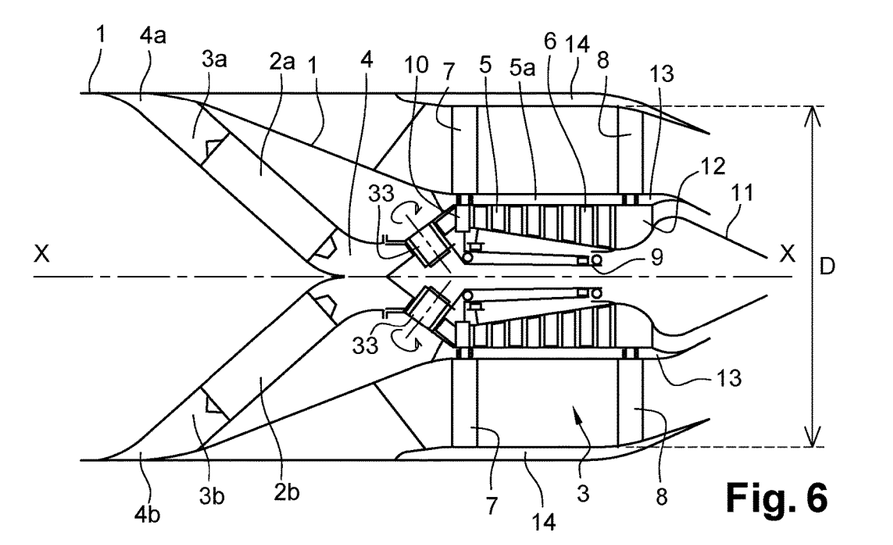
FIG. 6 is a schematic longitudinal section through the portion of the turbine engine according to another aspect of the invention.
Figure 7:
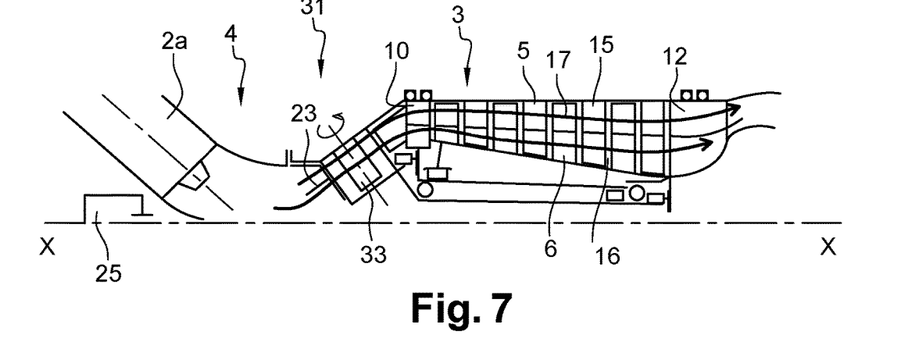
FIG. 7 is a schematic longitudinal half-section through the turbine engine according to the invention in the region of the power turbine in another operating mode.

According to a second aspect of the invention, the device comprises second distribution means 32, which comprise a ring of substantially radial, variable-pitch stator vanes 33 extending radially between the inner collar 21 and outer collar 22. This ring of variable-pitch stator vanes, or distributor vanes 33, plays the role of distributor at the intake of the rotors of the power turbine 3. In particular, the distributor vanes 33 are arranged at the intake of the power turbine and each pivot about an axis that passes through them and is substantially perpendicular, in a meridian plane, to the inner collar 21 and outer collar 22. The profile of the distributor vanes 33, as well as their angle of pitch, are adapted in order to optimise the functioning of the turbine engine.

For example, FR-A-1 555 756 discloses variable-pitch stator vanes arranged in a conduit in which power turbines are installed and in front of a ventilator. However, in this prior art document, the angle of the vanes is regulated in order to adapt the operating point of the ventilator and of the turbine rotor during normal operation. In other words, the pitch of these vanes is controlled depending on the quantity of energy necessary and demanded by the turbine rotors, only the incidence of the primary flow being modified.

By contrast, in the present invention, as mentioned above and as we will see in the continuation of the description, the angles of the distributor vanes 33 are adapted in order to optimise the operating point of the fan depending on engine systems, and to allow the rapid but steady closing of the intake cross section of the power turbine in a high-distortion environment. This makes it possible to steadily migrate the operating point of the low-pressure compressor of the gas generator still in operation (overcoming the shutdown of one of the gas generators). Aerodynamic conditions are restored (at the variable-pitch vane stage).

More specifically, according to the second aspect of the invention, the pitch angle of the distributor vanes 33 may be adjusted between relatively small values, approximately a few tenths of a degree, corresponding to an optimisation during normal operation of the turbine engine, and large values, corresponding to the fact of closing the passage cross section for the gases in order, advantageously, to only allow the passage of a flow equal to half the nominal flow, corresponding to the operation of a single gas generator.

Depending on their pitch, the distributor vanes 33 therefore fulfil two functions: a first, distributor function consisting of adapting the incidence of the primary flow before it can pass between the vanes of the first stage rotor in the power turbine, and a second function consisting of transversely varying the passage cross section for the primary flow towards the turbine. "Transversely varying the passage cross section" should be understood in this case to mean that the variation is substantially homogeneous in proportion along a radius.

With regard to the interaction with the intermediate collar 23, the distributor vanes 33 may be separated into two half-flaps, driven by the same rotary shaft but extending firstly between the inner collar 21 and the intermediate collar 23 and secondly between the intermediate collar 23 and the outer collar 22.

In a variant not shown in the figures, the distributor vanes 33 may be positioned at the end of the central flow duct 4 but upstream of the collars, in particular upstream of the device described below for controlling the passage within the concentric flow ducts 16, 17 of the power turbine 3. In this case, the distributor vanes 33 may be produced in one piece because they do not have to cross the intermediate collar 23.

Furthermore, the movements of the distributor vanes 33 are controlled by actuators (not shown) for varying the pitch angle more rapidly between its extreme values.

Preferably, the turbine engine also comprises actuation means (not shown) in order to optimise the pitch angle of the distributor vanes 33 to the operating point of the low-pressure compressor of the gas generators 2a, 2b. These actuation means may comprise sensors for detecting operating parameters of the low-pressure compressor and flow parameters downstream of the mixer, and a computer containing algorithms designed to send the appropriate commands to the actuators of the distributor vanes 33.

Methods for controlling the turbine engine thus equipped will now be described briefly.

When the turbine engine is in nominal operation, having its two gas generators operational, the actuators for the distributor vanes 33 can, under the control of the actuation means, vary the pitch angle of distributor vanes 33 slightly, by approximately several tenths of a degree. This makes it possible to adapt the flow entering the turbine engine to the operation of the compressors of the gas generators, according to the phases of flight and/or the features of the air flow entering through the air intakes 4a, 4b.

Figure 9:
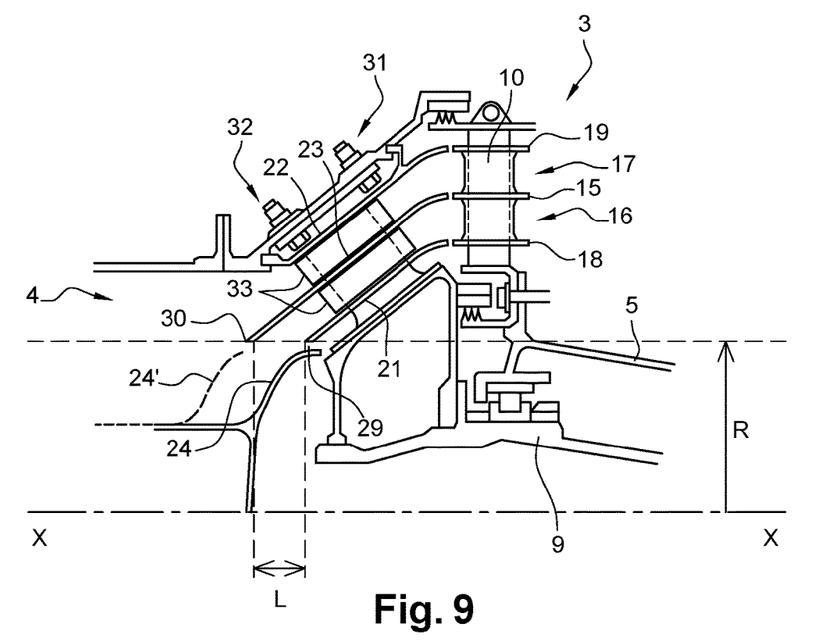
FIG. 9 is a schematic longitudinal half-section through an embodiment of second adjustable means for distributing the primary flow at the intake of the power turbine.

In case of accidental loss of one of the gas generators, a method for changing over, in such an aircraft, to operating the turbine engine using a single gas generator may comprise a step of rapid but steady positioning of the pitch angle of the distributor vanes 33 to their maximum position. This makes it possible to rapidly but steadily adjust the flow in the power turbine 3 using just one operational gas generator because the actuation means may control the variation of the passage cross section for the gases in order to avoid a surge or a shutdown of the surviving gas generator. This is done without moving the movable rotating part 24. The purpose of this stage may correspond, for example, to a first position of the distributor vanes 33 shown in FIG. 9.

Figure 8:
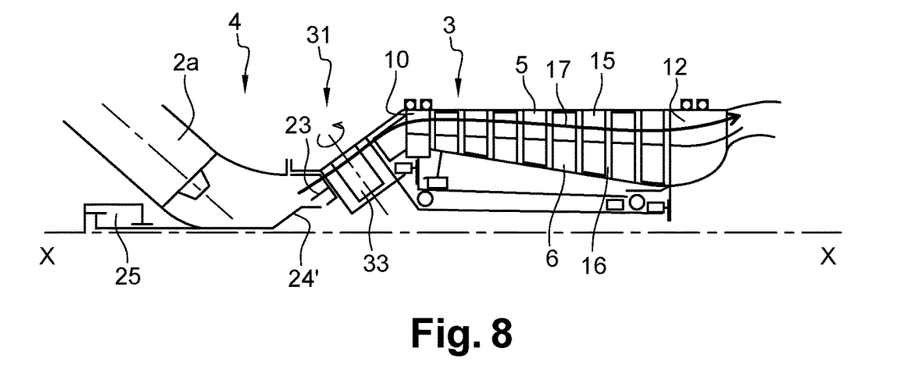
FIG. 8 is a view from above of a longitudinal half section through the turbine engine according to the invention in the region of the power turbine in another operating mode.

Then, in a second stage, the movable part 24 is moved forward, into position 24', in order to close the primary flow intake in the inner flow duct 16, while rotating the distributor vanes 33 in order to return them to a low pitch angle and to thus maintain the flow adjusted to the operation of said gas generator in the power turbine 3. The end of this second stage may correspond to the position of the distributor vanes 33 shown in FIG. 8, having a low pitch angle in order to minimise disturbances of the primary gas flow passing through the only outer flow duct 17. In a variant, the pitch of the distributor vanes 33 may be varied individually. This makes it possible to manage a local or circumferential distortion of the flow entering the power turbine 3. The problem arises in particular in this engine when, in the event of a shutdown of a gas generator, there would be a large disparity in azimuth of the flow entering the power turbine.

The sequence of these two stages smooths the flow variations during the transitional phase in order to allow the remaining operational gas generator to adapt and reach a configuration where the power turbine 3 is functioning optimally.

The invention has been presented in the case of two gas generators. In the case of several gas generators (not shown), for example three, a variant of the invention involves modifying the division of the passage cross sections between the inner flow duct 16 and the outer flow duct 17 of the power turbine 3, such that the passage cross section remaining when the inner flow duct 16 is blocked corresponds to the flow of the number of gas generators minus one. In the case of three gas generators, the ratios of the passage cross sections to the overall passage cross section are one third and two thirds, respectively, for the inner flow duct 16 and the outer flow duct 17. In this case, the intermediate collar 23 on the structural arms at the intake of the turbine is moved closer to the inner collar 21 as a result, and the axial distance L between its upstream edge 30 and the upstream edge 29 of the inner collar 21 is decreased by the same amount. In order to conceal the inner flow duct, the frustoconical movable part 24 must be moved by a lesser distance, but the operating principle of this variant is identical to the preceding one.

The two variants can function with more than two gas generators. In particular, in the case of three generators, the second variant can function if two of the gas generators shut down; it permits a smaller drop in the speed of the flow in the outer flow duct 16 than in the prior art and therefore decreases the power loss.

In the case of three generators, the third variant can be generalised by considering the turbine to be operating using two gas generators and the outer flow duct 16 and applying thereto the variant of the invention specified for two generators, i.e. dividing the outer flow duct into two concentric flow ducts.

Finally, the configuration of the variable-pitch distributor vanes 33 can stay the same in this variant. In the event of a shutdown of a gas generator, the method for controlling the turbine engine is substantially the same as in the preceding case, i.e. the rules for varying the pitch of the distributor vanes 33 over time and the limits to be adopted for the pitch amplitude. In particular, the maximum pitch amplitude of the distributor vanes is preferably adjusted in order to allow the passage cross section for the primary flow to be decreased by substantially the same amount as in the passage cross section corresponding to the closing of the concealable flow duct.

The invention claimed is:

1. Aircraft propelled by a turbine engine having contra-rotating fans, the turbine engine being integrated at the rear of a fuselage of the aircraft, in a continuation of the fuselage of the aircraft, and comprising at least two gas generators which feed a power turbine through a common central flow duct, said power turbine comprising two contra-rotating rotors for driving two fans arranged downstream of the at least two gas generators, wherein the aircraft comprises separating means arranged so as to separate a gas flow in the power turbine into at least two concentric flow ducts and a device that comprises a first distribution means for distributing the gas flow between the at least two concentric flow ducts from the common central flow duct, said first distribution means being designed to be able to open or close a gas feed of at least one flow duct, referred to as at least one concealable flow duct, from among the at least two concentric flow ducts of the power turbine.

2. Aircraft according to claim 1, wherein each contra-rotating rotor of the power turbine comprises at least one blade ring, the separating means for separating the flow into concentric flow ducts comprise fins extending circumferentially between a plurality of blades of each blade ring, at an intermediate radius between radial ends of the plurality of blades.

3. Aircraft according to claim 1, wherein a radially innermost concentric flow duct of the at least two concentric flow ducts in the power turbine is said at least one concealable flow duct.

4. Aircraft according to claim 1, wherein said at least one concealable flow duct comprises an intake opening in the common central flow duct, defined between two edges that are substantially defined by the same curve around an axis of the turbine engine and are offset along said axis.

5. Aircraft according to claim 4, wherein the first distribution means comprises a part that is movable in translation along the axis of the turbine engine, and is designed such that said part opens or closes the intake opening of said at least one concealable flow duct of the power turbine depending on its translational position.

6. Aircraft according to claim 1, wherein said aircraft comprises means designed to feed a ventilation air flow to said at least one concealable flow duct of the power turbine when the gas feed of said at least one concealable flow duct through the central flow duct is closed.

7. Aircraft according to claim 6, wherein said aircraft comprises closing means designed to close an outlet of said at least one concealable flow duct of the power turbine when the gas feed of said at least one concealable flow duct through the central flow duct is closed.

8. Aircraft according to claim 7, wherein the closing means for closing the outlet of said at least one concealable flow duct are controlled according to the difference between a resilient restoring force and a gas pressure at the outlet of said at least one concealable flow duct.

9. Aircraft according to claim 8, wherein a plurality of support arms for supporting a downstream housing, which rotates together with a rotor of the two contra-rotating rotors of the power turbine, are distributed in a ring at the outlet of said turbine, said plurality of support arms supporting said closing means.

10. Aircraft according to claim 9, wherein said closure means comprise flexible strips, each being secured to one support arm of the plurality of support arms in the region of a leading edge and extending in a circumferential direction up to a neighbouring support arm of the plurality of support arms when no force is exerted thereon in a direction originating from said at least one concealable flow duct.

11. Aircraft according to claim 1, wherein the device comprises a second distribution means comprising a ring of substantially radial, variable-pitch stator vanes.

12. Aircraft according to claim 11, wherein said aircraft comprises means that are intended for actuating the second distribution means and designed to vary a passage cross section for a primary flow in the common central flow duct depending on intake conditions of the at least two gas generator(s).

13. Aircraft according to claim 12, wherein the second distribution means are arranged so as to vary the passage cross section for the primary flow in the common central flow duct up to a minimum value that is equal to or less than a passage cross section in one of the at least two concentric flow ducts not closed by the first distribution means.

14. Aircraft according to claim 11, wherein the second distribution means are located downstream of the first distribution means in the gas flow.

15. Aircraft according to claim 1, wherein a first flow duct of said at least two concentric flow ducts is radially inner in relation to a second flow duct of said at least two concentric flow ducts.

16. Method for managing a breakdown of the turbine engine of the aircraft according to claim 1, for changing over from operation using two gas generators to operation using just one, comprising:
a closing step a), for closing a second distribution means so as to adjust the gas flow in the power turbine to a single gas generator in operation, and
a step b) consisting of closing the first distribution means while re-opening the second distribution means, so as to operate the power turbine using a single concentric flow duct of the at least two concentric flow ducts while maintaining the gas flow adapted to operation of the single gas generator.

17. Method for controlling the turbine engine of the aircraft according to claim 1, wherein a position of a second distribution means is controlled according to parameters influencing the operating ability of the low-pressure compressors of the at least two gas generators.

* * * * *